United States Patent [19]

Axmann

[11] Patent Number: 5,599,436
[45] Date of Patent: Feb. 4, 1997

[54] PROCESS FOR THE PREPARATION OF MANGANESE(III)-CONTAINING NICKEL HYDROXIDE

[75] Inventor: Peter Axmann, Göttingen, Germany

[73] Assignee: H. C. Starck GmbH & Co. KG, Goslar, Germany

[21] Appl. No.: 547,802

[22] Filed: Oct. 25, 1995

[30] Foreign Application Priority Data

Nov. 9, 1994 [DE] Germany .................. 44 39 987.1

[51] Int. Cl.$^6$ .............. C25B 1/20; C01G 45/00; C01G 1/00; C01G 49/00
[52] U.S. Cl. .............. 205/509; 423/50; 423/144; 423/594
[58] Field of Search .............. 205/50, 509, 557; 204/96; 423/50, 140, 144, 594; 429/223, 224

[56] References Cited

FOREIGN PATENT DOCUMENTS

| | | |
|---|---|---|
| 498566 | 8/1992 | European Pat. Off. . |
| 54-4335 | 1/1979 | Japan . |
| 5-47380 | 2/1993 | Japan . |

OTHER PUBLICATIONS

Power Sources, 1996, pp. 239–255, by J. P. Harivel, B. Morignat, J. Labat and J. F. Laurent, Fundamental Research Laboratory, Seine, France (translated) *month unavailable.

Primary Examiner—Bruce F. Bell
Assistant Examiner—Edna Wong
Attorney, Agent, or Firm—Jerry Cohen

[57] ABSTRACT

The present invention relates to a process for the preparation of manganese(III)-containing nickel(II) hydroxide powders, more than 50 mole % of the manganese being present in the trivalent oxidation state, by co-precipitation of nickel(II) and manganese salt solutions with alkali liquors.

9 Claims, No Drawings

PROCESS FOR THE PREPARATION OF MANGANESE(III)-CONTAINING NICKEL HYDROXIDE

The present invention relates to a process for the preparation of manganese(III)-containing nickel(II) hydroxide powders, more than 50 mole % of the manganese being present in the trivalent oxidation state, by co-precipitation of nickel(II) and manganese salt solutions with alkali liquors.

BACKGROUND OF THE INVENTION

The incorporation of manganese ions in nickel hydroxide is described in Power Sources 1966, Pergamon Press, pages 239 ff. Doping with manganese(II) ions leads to a product with a β-Ni(OH)$_2$ structure, and oxidation with hydrogen peroxide leads to amorphous manganese(IV) products. Neither product exhibits any improvements in the electrochemical properties compared with undoped nickel hydroxide.

It is shown in the relatively old published German patent application P 43 23 007.5 that the incorporation of trivalent manganese in nickel hydroxide leads to markedly improved cycle stability and thus to increased utilization of the one electron stage with a simultaneous nickel saving. The product may be prepared by reaction of a solution containing Mn(III) and Ni(II) ions with alkali liquors. A disadvantage of this process is its requirement for the use of large quantities of mineral acids such as $H_3PO_4$ or $H_2SO_4$, the anions of which are required to stabilize the trivalent manganese in the salt solution. These or other suitable anions prevent premature decomposition of the Mn(III) by disproportionation. Moreover, the process requires large quantities of alkali liquors, associated with the production of neutral salts in more than stoichiometric quantities which have to be removed via the waste water.

The object of the present invention is to provide an environmentally acceptable process for the preparation of Mn(III)-containing nickel hydroxides.

SUMMARY OF THE INVENTION

It has now been found that precipitation of Ni(II) and Mn(II) salts from alkaline solution with subsequent selective oxidation of the manganese leads, surprisingly, to an Mn(III)-containing nickel hydroxide with a pyroaurite structure. The conditions for precipitation and oxidation must be adhered to carefully during this process in order to prevent further oxidation of the Mn(III) ions to tetravalent manganese and disintegration of the pyroaurite structure.

The present invention therefore relates to a process for the preparation of manganese(III)-containing nickel(II) hydroxide powders, more than 50 mole % of the manganese being present in the trivalent oxidation state, by co-precipitation of nickel(II) and manganese(II) salt solutions with alkali liquors, wherein nickel and manganese salt solutions present in the divalent state are co-precipitated and the manganese contained in the co-precipitate is converted to the trivalent oxidation state with suitable oxidizing agents.

Oxidation may be carded out continuously or batchwise by adding suitable oxidising agents. Preferred oxidizing agents within the scope of this invention are oxygen, air and/or hydrogen peroxide. Said oxidizing agents have the advantage, inter alia, that they do not bring any additional anions into the reaction medium. Peroxodisulfates, chlorine or bromine may also, however, be used to advantage.

Combining the oxidizing agent with the salt solution containing nickel(II) ions and manganese(II) ions before addition to the co-precipitate may also be carried out advantageously, it being important to ensure, by adhering to the pH value in the salt solution, that oxidation of the manganese(II) ions does not take place already at this stage.

It is also possible to carry out a multi-stage process in which, in a first stage, the Ni(II)- and Mn(II)-containing mixed hydroxide is precipitated in the absence of oxidizing agents and the primary precipitation product is then oxidized in a second stage to Mn(III)-containing nickel hydroxide by transfer to an oxidizing preparation.

According to an advantageous variant of the process of the invention, the oxidation is carried out in an alkaline medium, at least 80 mole %, preferably at least 90 mole %, of the manganese being converted to the trivalent oxidation state.

The salt solution containing Ni(II) and Mn(II) ions may be prepared advantageously by dissolution of the corresponding salts, preferably sulfates, phosphates, chlorides and/or nitrates.

NaOH and/or KOH may be used as alkali liquors, spherical products being obtained in the further presence of ammonia.

In comparison with the process disclosed in the German patent application P 43 23 007.5, the salt load may be reduced to one third in the process according to the present invention. A further reduction is possible if the nickel and manganese salt solutions present in the divalent state are prepared by anodic dissolution of to metallic nickel and/or manganese.

According to an embodiment of the process of the invention favorable in terms of process technology the nickel and manganese salt solutions present in the divalent state are prepared by anodic dissolution of metallic nickel and by dissolution of manganese(II) salts.

If the Mn(III)-containing nickel hydroxide prepared according to the invention is to contain doping elements, as is required in some cases of nickel hydroxide for the production of batteries, the process according to the invention may be carried out preferably in the presence of zinc, cadmium, calcium, magnesium, cobalt, aluminium, iron, chromium, gallium, indium salts and/or salts of the rare earth elements.

A particularly advantageous aspect of the process according to the invention is that no unstable intermediate states occur in the salt solution. The concentration of the salt solution may therefore be adjusted to a very high level, thereby permitting high throughputs. Moreover, the process requires no stabilizing anions. This permits a free choice of the anions to be used, as a result of which the electrochemical properties of the end product can be influenced.

The manganese(III)-containing nickel hydroxide powder that can be obtained according to the invention is outstandingly suitable as an electrode material in secondary batteries. The invention therefore also relates to said use, i.e. the method of such use and electrodes made from such powder and batteries including such electrodes.

The invention is further explained below on the basis of the following non-limiting example:

EXAMPLE

Solutions A and B, described below, were used in a two step reaction governed by overall reaction formula (I):

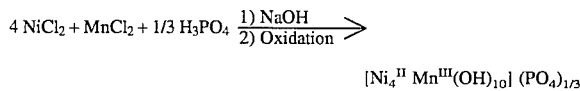

$$4\,NiCl_2 + MnCl_2 + 1/3\,H_3PO_4 \xrightarrow[\text{2) Oxidation}]{\text{1) NaOH}} [Ni_4^{II}\,Mn^{III}(OH)_{10}]\,(PO_4)_{1/3}$$

Solution A: 751 ml aqueous $NiCl_2$ solution with 125 g Ni/l (1.6 mole) 50 g $MnCl_2$ (0.4 mole) 10.8 ml conc. $H_3PO_4$ (0.13 mole)

Solution B: aqueous NaOH solution with 150 g NaOH/l

Description of test:

(1) A charge of 1.5 l of water was placed in a thermostated 5 l glass beaker at a temperature of 35° C. and adjusted to a pH of 12–12.5 with the aid of solution B. Solution A was then added slowly dropwise (1 drop per second) to the alkaline charge by means of a hose pump. The pH was monitored throughout the test by means of a glass electrode and if necessary kept constant at a pH of 12–12.5 by electronically controlled addition of solution B. A brownish green suspension was thus produced, indicating co-precipitation of Ni, Mn.

(2) A vortex was produced by stirring with a propeller stirrer (350 revolutions per minute) and atmospheric oxygen was introduced in this way into the brownish-greenish suspension. When the entire quantity of solution A had been introduced dropwise, the resulting brownish precipitate was filtered by a laboratory suction filter and washed with water at a temperature of 60° C. until it was free from neutral salts. The product, still damp, was subsequently dried for 24 hours at 70° C. in a vacuum drying cabinet and comminuted with a mortar to produce a powder. The powder was subjected to chemical and x-ray diffraction analysis.

Analyses:

| Content | Found | Theoretical |
|---------|-------|-------------|
| Ni | 43.53% | 47.8% |
| Mn | 9.58% | 11.2% |

The X-ray diffraction analysis revealed the pyroaurite spectrum.

Powders made according to the foregoing example or otherwise within the scope of the invention can be formed into principal charge storage/discharge electrodes by various known per se powder metallurgy means. The forms of such electrodes can be as plates, rods, wire and mesh. Such electrodes are incorporated into a battery case with one or more counter-electrodes, electrolyte and terminals for connection to external circuity for secondary battery operation (i.e. charge/discharge cycling of the nickel hydroxide principal electrode). As noted before, cycle stability is enhanced through the presence of a high trivalent proportion of the manganese dropout of the nickel hydroxide.

I claim:

1. A process for the preparation of manganese (III)-containing nickel (II) hydroxide powders, more than 80 mole % of the manganese being present in the trivalent oxidation state, the process comprising the co-precipitation of nickel (II) and manganese (II) salt solutions with alkali liquors, wherein the nickel and manganese salt solutions present in the divalent state are co-precipitated and the manganese contained in the co-precipitate is converted to the trivalent oxidation state by reaction with an oxidizing agent wherein the oxidizing agent is from the group consisting of oxygen, air, hydrogen oxidation is carried out in an alkaline medium.

2. A process according to claim 1, wherein at least 90 mole % of the manganese is converted to the trivalent oxidation state.

3. A process for the preparation of nickel (II) hydroxide powders containing manganese with more than 50 mole % of the manganese present in its trivalent oxidation state comprising the steps of:

(a) bringing together salt solutions of nickel (II) and manganese (II) and alkali liquor under conditions to cause co-precipitation of nickel and manganese in a suspension, and (b) adding an oxidation agent to the suspension to selectively oxidize the manganese to produce a precipitate as a powder product which has a pyroaurite structure, as indicated by x-ray diffraction.

4. A process according to any of claims 1, 2 or 3, wherein in that the nickel and manganese salt solutions present in the divalent state are prepared by dissolution of compounds of nickel (II) and manganese (II) selected from the groups consisting of their chlorides, sulfates, nitrates and phosphates.

5. A process according to any of claims 1, 2 or 3, wherein in that at least one of the nickel and manganese salt solutions present in the divalent state are prepared by anodic dissolution of their respective metallic forms.

6. A process according to any of claims 1, 2 or 3 wherein in that the nickel and manganese salt solutions present in the divalent state are prepared by anodic dissolution of metallic nickel and by dissolution of manganese (II) salts.

7. A process according to any of claims 1, 2 or 3, wherein in that the co-precipitation is carried out in the presence of soluble salts selected from the group consisting of salts of Zn, Cd, Ca, Mg, Co, Al, Fe, Cr, Ga, In and the rare earth elements.

8. A process according to claim 7, wherein in that at least one of the nickel and manganese salt solutions present in the divalent state are prepared by anodic dissolution of their respective metallic forms.

9. A process according to claim 7, wherein in that the nickel and manganese salt solutions present in the divalent state are prepared by anodic dissolution of metallic nickel and by dissolution of manganese (II) salts.

* * * * *